United States Patent
Oda et al.

(10) Patent No.: US 6,868,362 B1
(45) Date of Patent: Mar. 15, 2005

(54) SENSOR SYSTEM

(75) Inventors: Hajime Oda, Chiba-ken (JP); Kimitaka Kishimoto, Chiba-ken (JP)

(73) Assignee: Seiko Precision Inc., Tokyo (JP)

( * ) Notice: Subject to any disclaimer, the term of this patent is extended or adjusted under 35 U.S.C. 154(b) by 0 days.

(21) Appl. No.: 09/516,718

(22) Filed: Mar. 1, 2000

(30) Foreign Application Priority Data

Mar. 31, 1999  (JP) ........................................... 11-092934

(51) Int. Cl.$^7$ ...................... G01B 11/02; G01B 11/14; G01B 13/02; G01B 21/02; G01B 5/02
(52) U.S. Cl. ...................................... 702/158; 702/127
(58) Field of Search ................................ 702/127, 158; 396/106–110, 129; 356/152.1, 909, 914; 250/348, 363, 363.2; 318/490; 188/1.12

(56) References Cited

U.S. PATENT DOCUMENTS

| | | | | |
|---|---|---|---|---|
| 4,212,523 A | * | 7/1980 | Yamada et al. | 356/152.1 |
| 4,435,058 A | * | 3/1984 | Yoshida et al. | 702/127 |
| 4,785,322 A | * | 11/1988 | Harrison et al. | 396/106 |
| RE35,607 E | * | 9/1997 | Nagamune et al. | 342/130 |
| 5,752,115 A | * | 5/1998 | McIntyre et al. | 396/431 |
| 5,832,324 A | * | 11/1998 | Shimizu et al. | 702/159 |
| 5,838,244 A | | 11/1998 | Schmidt et al. | |
| 5,864,778 A | * | 1/1999 | Morcom et al. | 702/158 |
| 5,915,233 A | * | 6/1999 | Nonaka | 702/158 |
| 5,970,433 A | * | 10/1999 | Oka et al. | 702/159 |
| 5,986,750 A | * | 11/1999 | Sasabe et al. | 356/152.1 |
| 5,987,395 A | * | 11/1999 | Donges | 702/149 |
| 6,124,692 A | * | 9/2000 | Canada et al. | 318/490 |
| 6,125,972 A | * | 10/2000 | French et al. | 188/1.12 |
| 6,330,519 B1 | * | 12/2001 | Sawatari | 702/127 |
| 6,336,362 B1 | * | 1/2002 | Duenas | 702/158 |

FOREIGN PATENT DOCUMENTS

| | | |
|---|---|---|
| DE | 3226253 | 1/1984 |
| JP | 4-68927 | 3/1992 |
| JP | 8-170986 | 7/1996 |

* cited by examiner

*Primary Examiner*—John Barlow
*Assistant Examiner*—Aditya Bhat
(74) *Attorney, Agent, or Firm*—Jordan and Hamburg LLP

(57) ABSTRACT

There is disclosed a power-saving sensor system such as a distance measurement sensor making use of light projection type triangulation. The sensor system has a sensor means and a CPU for controlling the supply of electrical power to the sensor means, accepting the output from the sensor means, and performing desired processing. The CPU turns on signals $P_1$, $P_2$, $P_3$ in response to a trigger signal Tp from a timer circuit, thus supplying electrical power to a distance measurement module. A distance measurement IC within the module produces an emission signal when the operating signal $P_3$ is turned on. This activates the sensor means to perform a measurement of a distance. The presence or absence of an object is determined from the detected distance value. According to the presence or absence, a transistor $Tr_2$ is turned on or off. A signal indicating the distance or the presence or absence of an object is produced from a terminal $T_8$. The CPU detects the end of light projection by making use of an inversion Iri of the emission signal. Immediately thereafter, a signal $P_4$ is turned on to turn on a switch $SW_2$. The signal is accepted through a terminal Data. Immediately after the end of the acceptance, the signals $P_4$, $P_2$, $P_1$, and $P_3$ are turned off, cutting off the supply of power to the distance measurement module.

19 Claims, 6 Drawing Sheets

FIG. 6
PRIOR ART
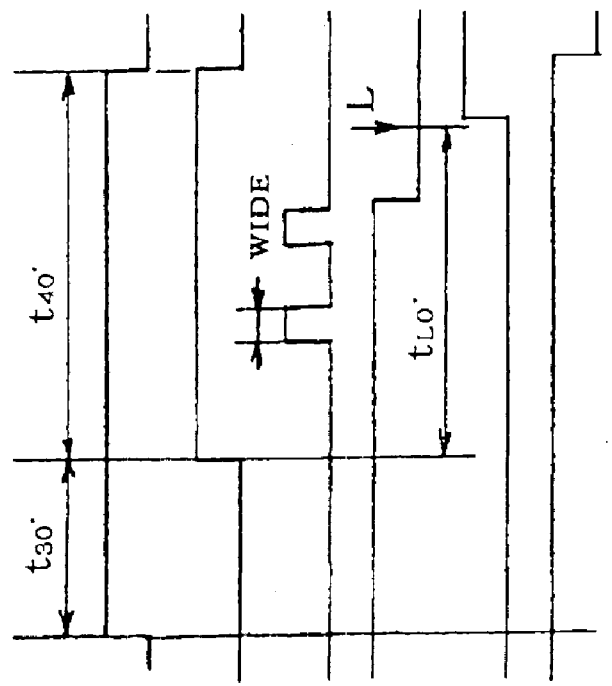
(b)
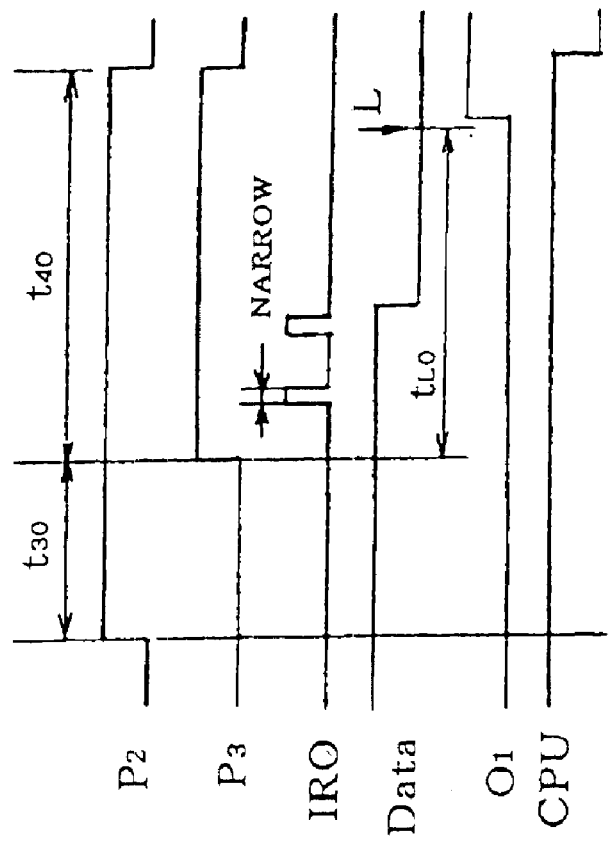
(a)

SENSOR SYSTEM

BACKGROUND OF THE INVENTION

1. Field of the Invention

The present invention relates to a sensor system.

2. Description of the Related Art

A distance measurement sensor of the light projection triangulation type is available which directs pulsed light to an object to be measured and in which a light receiver portion is located at a given base line length from a light projector portion and light reflected from the object is received by the light receiver portion, and the distance to the object to be measured is determined. If this sensor is operated at a high speed continuously, a large amount of electrical power is consumed.

A conceivable method of reducing the power consumed by such sensor is illustrated in FIG. 4, where a general-purpose controller is added to the sensor. This controller controls the operation of the sensor such that it operates slowly and intermittently.

The configuration shown in FIG. 4 is briefly described. The general-purpose controller (hereinafter referred to as CNT) is indicated by numeral 100 and uses a battery E as a power supply and is connected with a distance measurement module (DMM) 200 via terminals $T_1$–$T_8$ and controls the operation of the distance measurement module 200 via these terminals. Let Tp, $P_1$, $P_2$, and $P_3$ be output signals appearing at terminals Tp, $P_1$, $P_2$, and $P_3$, respectively, shown in FIG. 4.

The CNT 100 is now described. The CNT 100 has a low power-consumption power-supply regulator circuit (hereinafter referred to as REG) 103 for providing a low power-consumption power source $V_{reg1}$ to a low power-consumption timer circuit (hereinafter referred to as RTC) 101 and to a CPU 102. A power-supply circuit (REG) 104 provides a power source $V_{reg2}$ used as a power source to the DMM 200. The RTC 101 intermittently supplies a trigger signal Tp to the CPU 102, which in turn is triggered by the trigger signal Tp and operates in a given manner. Normally, the CPU 102 is in a standby mode in which the CPU consumes only quite a small amount of electrical power. When the signal $P_1$ from the CPU 102 is ON, the power-supply circuit (REG) 104 generates voltage $V_{reg2}$. When the signal $P_1$ is OFF, the power-supply circuit (REG) 104 is in a standby mode in which the circuit consumes only a quite small amount of electrical power. The output signal $P_2$ from the CPU 102 turns on or off the switch $SW_1$. When the signal $P_2$ is ON, the switch $SW_1$ permits supply of a voltage to the DMM 200. A resistor $R_1$ and a capacitor $C_2$ together form a power-supply filter circuit 105 for a distance measurement IC (hereinafter referred to as DMIC) 201. Where the time constant is set large and a large current flows through an IRED (infrared-emitting diode) 202, the filter circuit 105 suppresses variations in the electrical power through the DMIC 201. Also shown are a capacitor $C_1$ and a resistor $R_4$.

The DMM 200 is made up of the DMIC 201, the IRED 202, a PSD (position-sensitive detector) 203, resistors $R_2$, $R_3$, transistors $Tr_1$, $Tr_2$, a capacitor $C_c$, and so on, and operates as a distance measurement sensor. This sensor has an output terminal at which a signal indicating the result of a distance measurement appears. This output terminal is the collector of the transistor $Tr_2$. That is, the output terminal for producing a signal indicating the result of a distance measurement is the output terminal of open collector type.

The operation is next described briefly by referring to FIG. 5, where Tp, $P_1$, $V_{reg2}$, $P_2$, Vd, $P_3$, $Ir_0$, Data, and $O_1$ indicate voltage waveforms at terminals Tp, $P_1$, $V_{reg2}$, $P_2$, Vd, $P_3$, $IR_0$, Data, and $O_1$, respectively, shown in FIG. 4. In FIG. 5, $IR_4$ indicates the waveform of current at a terminal $IR_4$ shown in FIG. 4. In FIG. 5, CPU indicates the relation between the operation of the CPU shown in FIG. 4 and its standby mode.

The RTC 101 produces the trigger signal Tp at intervals of $t_{00}$ time. In response to this, the CPU 102 turns on the signal $P_1$ for a period of $t_{10}$ time and operates the REG 104. After a lapse of $t_{20}$ time, the operation of the power-supply circuit 104 stabilizes. Then, the signal $P_2$ is turned on, thus turning on the switch $SW_1$. The output voltage $V_{reg2}$ from the REG 104 is supplied to the filter circuit 105, whose output voltage Vd is applied as electrical power to the DMM 200.

In response to the signal $P_2$ being turned on, electrical power is supplied to the DMIC 201 within the DMIC 200. Then, the CPU 102 waits for a period of $t_{30}$ time to stabilize the DMIC 201. The CPU 102 turns on the operating signal $P_3$ for a period of $t_{40}$ time, thus causing the DMM 200 to start an operation for a distance measurement.

In response to the application of the operating signal $P_3$ that is in an ON state, the DMIC 201 produces an emission signal $IR_0$ to operate the IRED 202 to perform a measurement of a distance. The result is reflected in the state (i.e., ON or OFF) of the transistor $Tr_2$. The result is sent to the CPU 102 from the collector terminal of the transistor $Tr_2$. In particular, if an object to be measured is detected, the transistor $Tr_2$ is turned on, causing the terminal $T_8$ to assume state 0. If no object to be measured is detected, the transistor $Tr_2$ is turned off, making the terminal $T_8$ assume state 1. When the ON state of the signal $P_3$ ends, the CPU 102 turns off the signals $P_1$ and $P_2$ and returns to the standby mode.

In this way, the CNT 100 controls the operation of the DMM 200 to make intermittent the distance measurement operation of the DMM 200.

In the distance measurement sensor as described above, the capacitor $C_c$ or the like is connected with the distance measurement IC (DMIC) 201 to generate a given frequency. A timing signal for the distance measurement operation is created according to the generated frequency. Therefore, depending on the specifications of the distance measurement sensor, the pulse width of the light emitted from the IRED 202 may be increased. For this purpose, this operating frequency $f_0$ may be lowered. That is, the time taken to project light has some interval of time.

Where this is taken into consideration, in order to assure that data obtained by a measurement of a distance is accepted into the CPU 102 by operating the DMM 200 intermittently, the supply of electrical power to the DMM 200 should not be interrupted during the measurement operation, even if the operating speed of the DMM 200 is low and a long time is taken to emit light.

To solve the aforementioned problem, it is necessary to set the time between the instant when the DMM 200 starts an operation for a distance measurement operation and the instant when the power supply is turned off, i.e., the period of the ON state of the signal $P_3$, be set so long that no troubles take place if the operating frequency $f_0$ is lowest. In this case, an allowance is given, and the possibility of occurrence of malfunctions decreases accordingly. However, the amount of wasteful power consumption increases.

In another method, an adjusting means is fitted to the CNT 100. According to the specifications of the DMM 200, the timing at which the CNT 100 accepts measurement data is slowed or the time for which electrical power is supplied to the sensor is set sufficiently long. In this way, an adjustment is necessary. That is, in this case, the CNT 100 must be adjusted according to the actually used operating timing of the DMM 200. If a general-purpose product is used as the CNT 100, each individual product needs adjustments. Furthermore, if the CNT 100 is managed by adjusting it, the operating frequency $f_0$ varies due to variations in capacitance among the individual products used as the capacitor $C_c$, temperature variations, and variations in characteristics among the individual products used as the DMIC 201. To cope with variations in the time taken to emit light due to variations in the operating frequency $f_0$ as described above, it is necessary to set the period of the ON state of the signal $P_3$ at a sufficiently long time, even if cumber some operations such as adjustments are performed. As a result, a voltage is kept applied to the DMIC 201 in spite of the fact that the distance measurement operation has already ended in practice. Hence, electrical power continues to be wasted.

This drawback is described by referring to FIGS. 6(a) and 6(b). FIG. 6(a) illustrates the operation when the operating frequency $f_0$ is high. FIG. 6(b) illustrates the operation when the operating frequency $f_0$ is low. The time between the leading edge of the signal $P_3$ and the latching time L is set constant and sufficiently long (tL0=tL0', $t_{30}=t_{30}'$, $t_{40}=t_{40}'$) so that data can be latched at L even if the operating frequency $f_0$ varies. After being read into the CPU 102 and processed, data is delivered from the output terminal $O_1$. Then, the signals $P_2$ and $P_3$ are turned off to stop the supply of electrical power. Also, the CPU 102 itself makes a transition from the operation mode to the standby mode. That is, even after the distance measurement operation ends and data derived from the measurement is delivered, a voltage is kept applied to the DMIC 201. In consequence, wasteful power consumption continues.

This problem is not limited to a light projector-type distance measurement sensor. Rather, this problem arises with every sensor means that performs a desired measurement and then produces an output signal corresponding to the results of the measurement. That is, where the time taken to perform a given measurement has some interval of time, electrical power is supplied for a time sufficient to accommodate the interval. This method produces the aforementioned problem.

Many sensors use the open collector output ($Tr_2$) to send data even to a system using a different voltage or to permit a relay or the like to be directly activated. In this scheme, a pull-up resistor $R_4$ is coupled to the electrical power $V_{reg1}$ for the CPU 102 to accept data.

This DMM 200 judges whether there is an object to be measured or not. If an object to be measured is detected, the transistor $Tr_2$ that is normally OFF is kept ON. In this configuration, current is kept supplied to the pull-up resistor $R_4$ from the power source $V_{reg1}$ during the period $t_{50}$ between the instant when the signal $Tr_2$ is turned on and the instant when the signal $P_3$ is turned off and during the period $t_{60}$ between the instant when the period $t_{50}$ ends and the instant when the voltage vd reaches the cutoff voltage Vth of the distance measurement IC (DMIC) 201, as shown in FIG. 5, for the following reason. Even if the power to the distance measurement module 200 is cut off, the voltage vd applied to the DMIC 201 does not quickly drop to zero because of electric charge stored in the capacitor $C_2$. Rather, the voltage gradually decreases to the cutoff voltage of DMIC 201 because of power consumption by DMM 200. Therefore, the power consumption at the resistor $R_4$ hinders lower power consumption. If the voltage Vd further drops to the cutoff voltage Vth, the state is often maintained for a relatively short time (from on the order of seconds to on the order of minutes). If power is then supplied, the transistor $Tr_2$ may be kept in conduction. Current starts to flow into the pull-up resistor from the application of the power during a period of $t_{70}$ time. Such a current is important to a low power-consumption sensor. This hinders reducing the power consumption.

SUMMARY OF THE INVENTION

The present invention provides a sensor system having a sensor and a controller for controlling the supply of electrical power to the sensor. The controller accepts the output signal from the sensor and performs desired processing. The controller includes a power-supply switch for switching on and off the supply of electrical power to the sensor and a control circuit for turning off the power-supply switch in response to acceptance of the output from the sensor. This assures that the output from the sensor is accepted. Furthermore, power consumption can be curtailed. Therefore, the problems with the prior art construction can be reduced. In the past, electrical power has been wasted to assure acceptance of the output from the sensor, or the power application time has been set short to reduce wasteful power consumption, which would have made it impossible to accept the sensor output.

Where the aforementioned sensor is a distance measurement sensor comprising a light projector means, a driver circuit for supplying an emission signal to the projector means, and a light-receiving means for receiving light arising from the projection of light from the light projector means, if the controller described above initiates acceptance of the output from the sensor in response to the emission signal, the same advantages can be obtained as the foregoing. Furthermore, the emission signal can be used for light projection and for the start of acceptance, thus simplifying the structure compared with the structure in which signals for the light projection and for the start of acceptance, respectively, are produced.

The electric current wasted by resistors can be reduced further by the following configuration. The sensor described above has an open collector type output terminal producing the aforementioned output. The controller described above further includes a series combination of a resistor and a switching means. The series combination is connected between the output terminal described above and a power supply. A voltage developed at a junction terminal of the resistor and the output terminal is accepted as the output from the sensor. The control circuit turns on or off the switching means according to the emission signal.

Where the controller assumes a standby state in which the power consumption is low, in response to the end of the desired processing, the same advantages as the foregoing can be had. Furthermore, the controller achieves further reduction of power consumption.

Other objects and features of the invention will apparent in the course of the description thereof, which follows.

BRIEF DESCRIPTION OF THE DRAWINGS

FIG. 6 is a timing chart illustrating the operation of the prior art sensor system shown in FIG. 4.

DESCRIPTION OF THE PREFERRED EMBODIMENT

Details of the present invention are hereinafter described in relation to one embodiment illustrated in the accompanying drawings. A distance measurement sensor (distance measurement module) is taken as an example of the sensor. The sensor is not limited to this. Any sensor for detecting or measuring an object of interest may also be used as the sensor.

Figure 1:
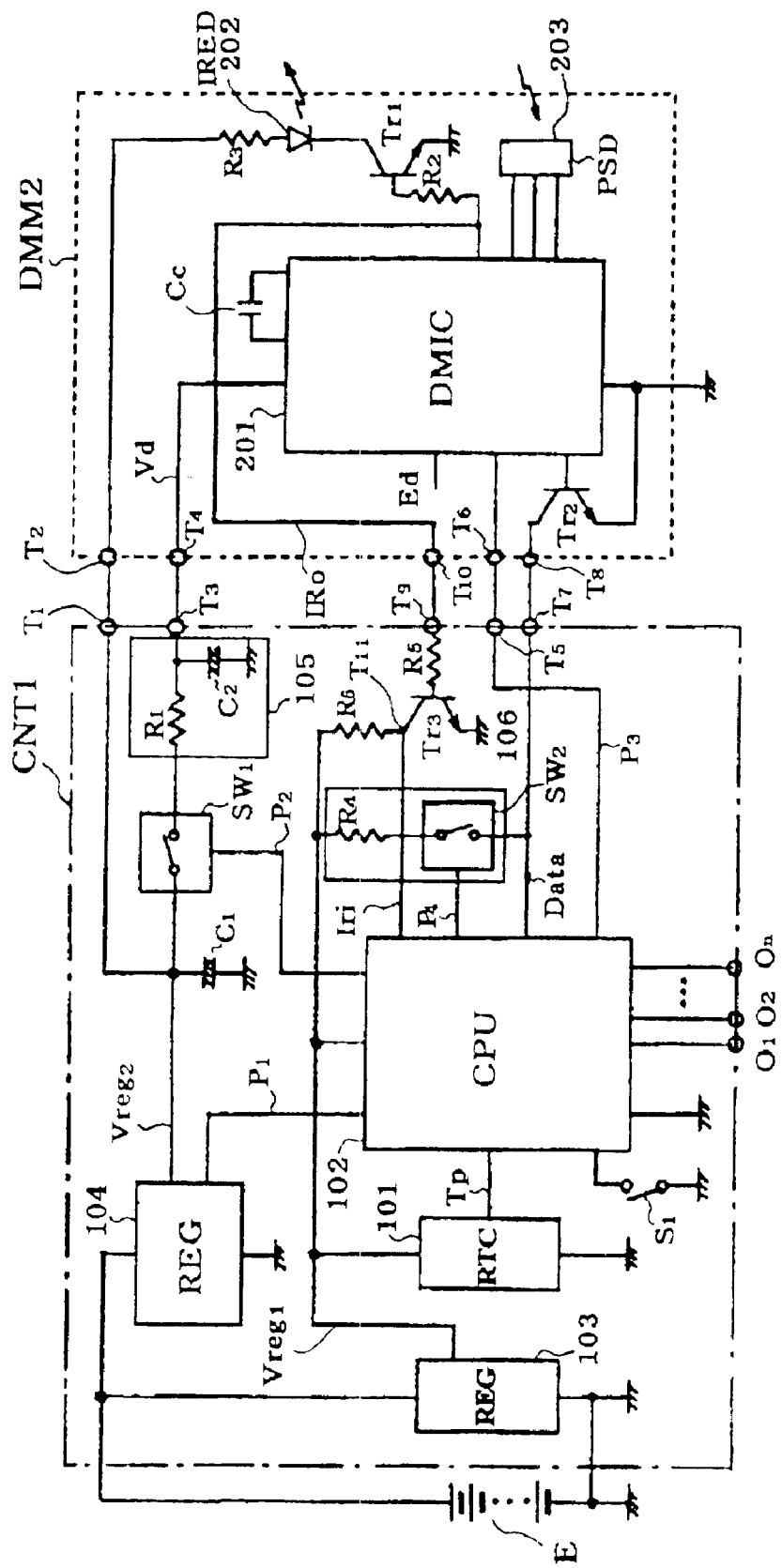
FIG. 1 is a circuit block diagram of a sensor system in accordance with the present invention.
Figure 2:
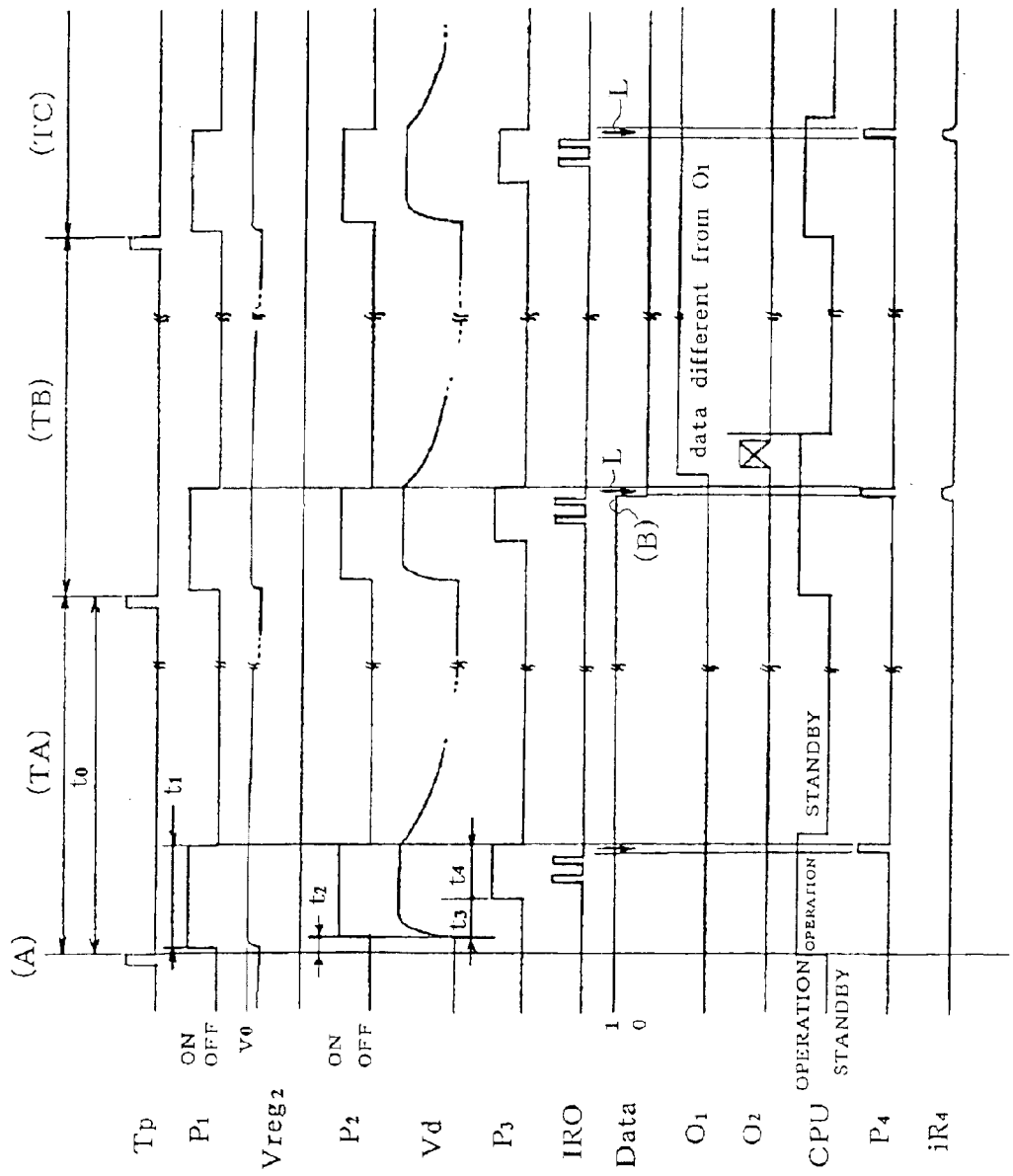
FIG. 2 is a timing chart illustrating the operation of the sensor system shown in FIG. 1.
Figure 3:
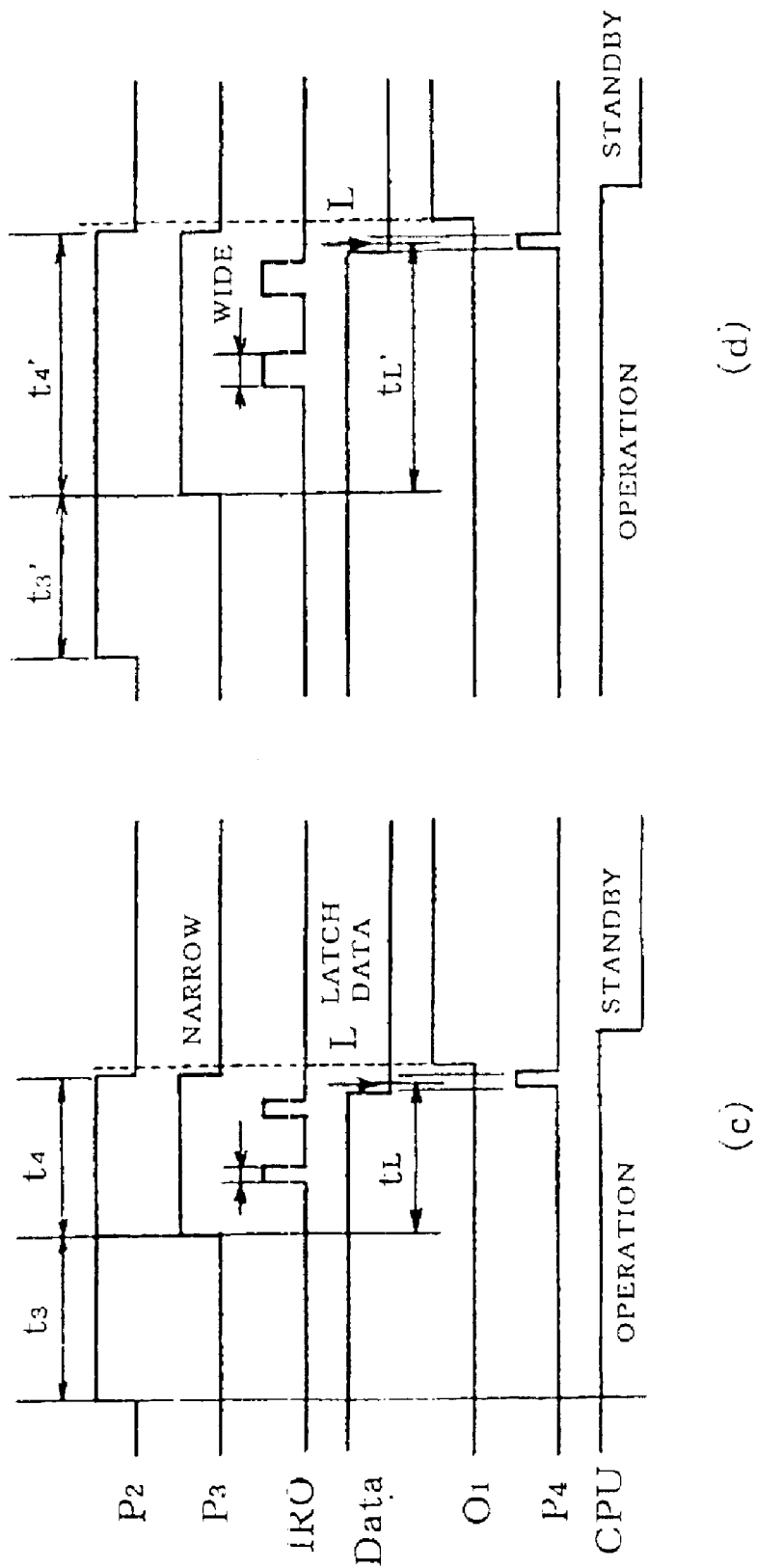
FIG. 3 is a timing chart illustrating the operation of the sensor system shown in FIG. 1.
Figure 4:
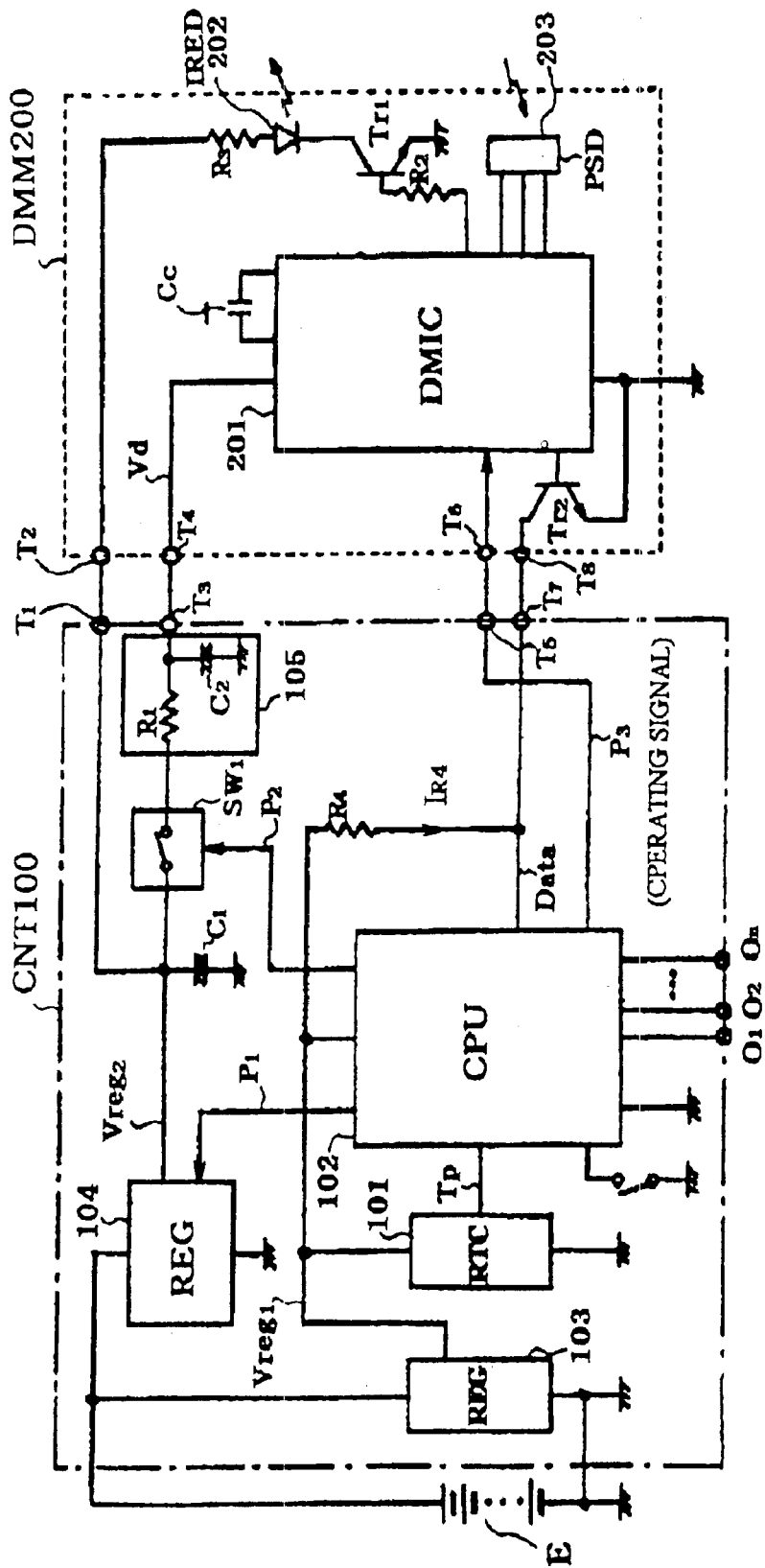
FIG. 4 is a circuit block diagram of the prior art sensor system.
Figure 5:
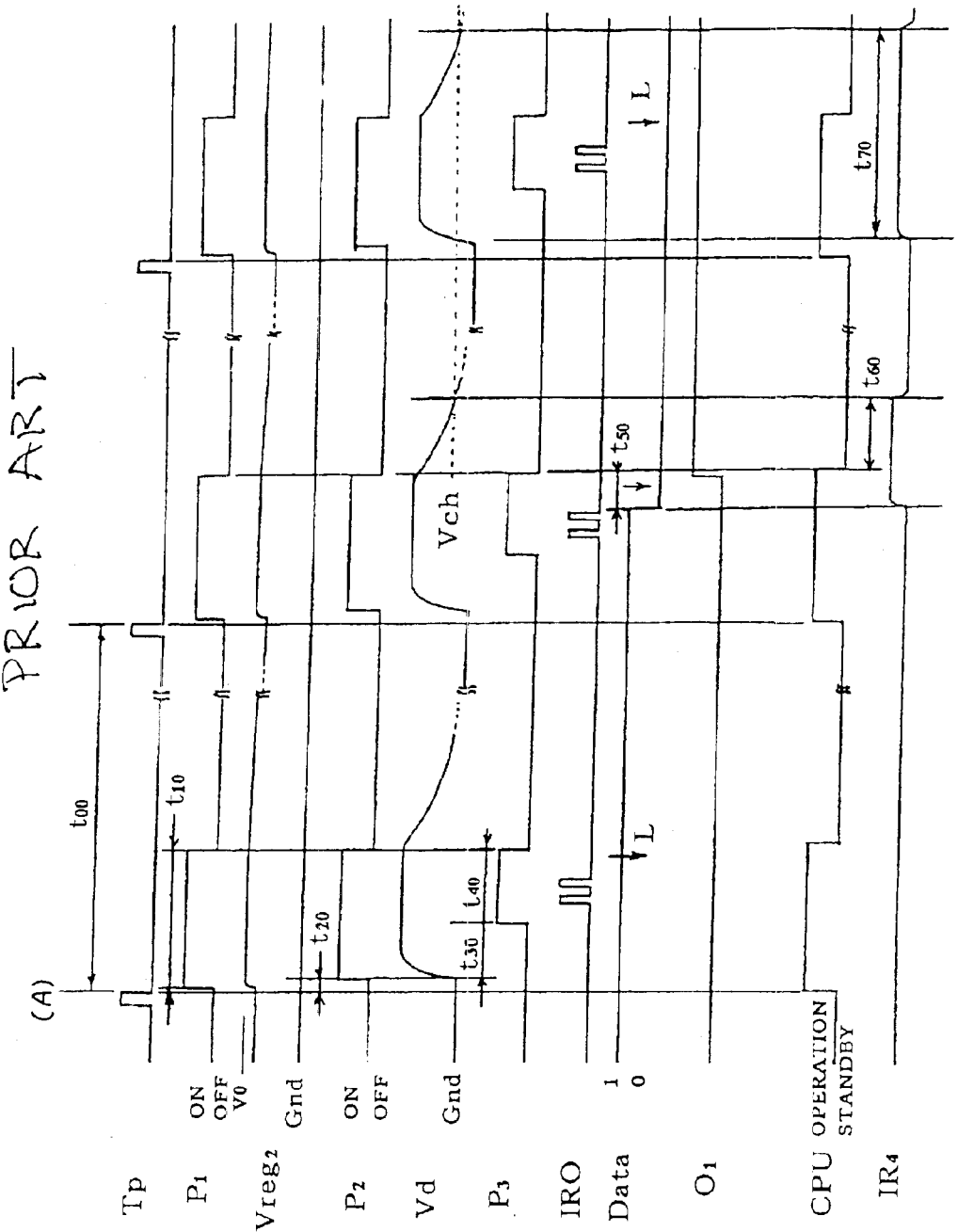
FIG. 5 is a timing chart illustrating the operation of the prior art sensor system shown in FIG. 4.

FIG. 1 is a circuit block diagram of a sensor system in accordance with the invention. FIGS. 2 and 3 are timing diagrams illustrating the operation. Note that like components are indicated by like reference numerals in both FIGS. 1 and 4.

Referring to FIG. 1, a controller (hereinafter referred to as CNT) 1 acts as a control means and uses a battery E as its power supply. The controller 1 is connected with a distance measurement module (hereinafter referred to as DMM) 2 via terminals $T_1$–$T_{10}$, and controls the operation of the DMM 2 via these terminals. A series circuit 106 consists of a series combination of a so-called pull-up resistor $R_4$ and a switching means $SW_2$, and is connected between a low power-consumption power source $V_{reg1}$ from a REG 103 and the output terminal $T_8$ (open collector type output terminal) of the distance measurement DMM 2 connected via the terminal $T_7$. An emission signal $IR_0$ for the (infrared-emitting diode) IRED 202 is applied to the base of the transistor $Tr_3$ via the resistor $R_5$. The collector of the transistor $Tr_3$ is connected with the power source $V_{reg1}$ of the REG 103 via the resistor $R_6$. A junction terminal $T_1$ between the collector of the transistor $Tr_3$ and the resistor $R_6$ is connected with the CPU 102.

The operation is described by referring to FIG. 2. Note that like waveforms are indicated by like reference numerals in both FIGS. 2 and 4. In FIG. 2, $O_2$ and $P_4$ indicate voltage waveforms at the terminals $O_2$ and $P_4$, respectively, shown in FIG. 1.

The RTC 101 produces the trigger signal Tp at intervals of $t_0$ (e.g., 0.5 second). In response to this, the CPU 102 turns on the signal $P_1$ to operate the REG 104. After a lapse of $t_2$, the operation of the REG 104 stabilizes. Then the signal $P_2$ is turned on, thus turning on the switch $SW_1$. The voltage $V_{reg2}$ from the REG 104 is applied to the filter circuit 105. Its output voltage vd is supplied as electrical power to the DMIC 201. The operation is the same as the operation of the prior art structure shown in FIG. 4 up to this point.

After electrical power is supplied to the DMIC 201 in response to ON state of the signal $P_2$, the CPU 102 waits for a period of $t_3$, i.e., until the operation of the DMIC 201 stabilizes. Then, the operating signal $P_3$ is turned on to start an operation for a measurement of a distance using the DMM 2. In the present embodiment, the ON time of this operating signal $P_3$ is not previously set on the side of the CNT 1. Rather, the ON time is adjusted according to the operation of the DMM 2. Hence, the amount of electrical power wasted is reduced compared with the prior art technique. This operation will be described later.

The DMIC 201 in the DMM 2 produces the emission signal $IR_0$ in response to application of the operating signal $P_3$ in an ON state. This operates the infrared-emitting diode (IRED) 202 to perform a measurement of a distance. Specifically, the IRED 202 is made to emit light a given number of times (two times in the present example). Light reflected from an object to be measured is received by the PSD 203. The output from the PSD 203 is arithmetically processed to detect the distance. In response to information including the detected distance value and the presence or absence of an object judged from the distance value, the transistor $Tr_2$ is turned on or off. A signal indicating this information about the distance and the presence or absence is made to appear at the terminal $T_8$. In the present example, where an object is detected, the transistor $Tr_2$ is turned on. Where no object is detected, the transistor $Tr_2$ is turned off.

The emission signal $IR_0$ produced from the IRED 202 while the DMM 2 is performing a measurement of a distance is inverted in level by the resistor $R_5$ the transistor $Tr_3$, and the resistor $R_6$, producing an inverted signal Iri to the CPU 102. The emission signal $IR_0$ is normally a relatively short pulse of approximately microseconds to tens of microseconds and so the increase in the average current consumption due to the level inversion is slight.

The CPU 102 detects the end of the light projection operation of the IRED 202 by making use of the inverted signal Iri. In the present embodiment, it is assumed that the emission operation is ended when the IRED 202 emits light twice. The end of the emission operation is detected by detecting the trailing edge of the second pulse of the emission signal $IR_0$. The number of emissions is not limited to two. The number may be modified properly.

On detection of the end of the light projection, the CPU 102 judges that information indicating the presence or absence of an object is produced from the DMM 2. To permit the information to be read, the CPU 102 immediately turns on the signal $P_4$. This turns on the switch $SW_2$. Therefore, the pull-up resistor 4 is connected with the collector of the transistor $Tr_2$. A signal produced at the terminal $T_8$ and coming from the DMM 2 can be read via the terminal Data. That is, the terminal $T_8$ is coupled to the voltage $V_{reg1}$ via thepull-up resistor 4. Consequently, the voltage at the terminal Data assumes level 1 or 0, depending on whether the transistor $Tr_2$ is ON or OFF. The CPU 102 can read this as a binary-coded signal and accept it.

After a lapse of the period (several microseconds to several tens of microseconds in practice) beginning with the end of the light projection from the IRED 202 and ending with production of information indicating the presence or absence of an object since the CPU 102 has turned on the signal $P_4$, the signal appearing at the terminal Data and carrying information indicating the presence or absence of an object is latched, or accepted, in the DMIC 201. If the rising portion of the voltage waveform is distorted due to the ON resistance of the switch $SW_2$ or capacitance when the signal $P_4$ is turned on to connect the resistor $R_4$, the CPU may wait for a time (several microseconds at the longest) longer than normal until the voltage becomes constant since the signal $P_4$ has been turned on. In this way, the information is accepted after sensing that a signal carrying information indicating the presence or absence of an object appears at the terminal Data and so the time between the instant when the information is produced and the instant when the information is accepted can be controlled. Therefore, the aforementioned time between the instant when a signal carrying information indicating the presence or absence of an object appears at the terminal Data and the instant when the information is read is prevented from becoming long wastefully. That is, the wasteful wait time can be reduced.

Immediately after accepting the information from the DMM 2 as described above, the CPU 102 turns off the signal $P_4$, turning off the switch $SW_2$. This disconnects the resistor $R_4$. The signals $P_2$, $P_1$, and $P_3$ are then turned off. The supply of electrical power to the DMM 2 is cut off. As a result, the ON time of the signal $P_3$ becomes shorter than conventional. The current $iR_4$ flowing into the resistor $R_4$ is quite slight on average.

Since the CNT 1 (control circuit) turns off the power-supply switch $SW_1$ in response to the acceptance of the output from the DMM2 (sensor means) in this way, it is assured that the output from the DMM2 is accepted. Furthermore, electrical power can be saved. Consequently, the sensor system in accordance with the present invention is free from the problems which would have occurred with the prior art sensor system. That is, in the prior art sensor system, supply of electrical power is continued in spite of the end of the operation of a sensor to assure reading of a signal from the sensor means, resulting in a wastage of power. Where the supply of electrical power to the sensor means is cut off while the sensor means is in operation in an attempt to reduce wasteful power consumption, it will be impossible to read the output from the sensor means.

After sensing that a signal indicating the presence or absence of an object appears at the terminal Data, the signal is accepted. Immediately after the end of the acceptance, the supply of electrical power to the DMM2 is cut off. Therefore, the time between the instant when the signal indicating the presence or absence of an object is produced to the terminal Data and the instant when the signal is accepted is prevented from becoming wastefully long; otherwise, power would be wasted.

Since the emission signal $Ir_0$ for the IRED 202 (light projection means) is used to control the timing at which the output signal from the DMM 2 is accepted. Therefore, the structure can be simplified. That is, it is not necessary to produce two signals used for projection of light and for start of acceptance of the output signal, respectively; otherwise, the structure would be complicated.

Where the DMM2 (sensor means) for producing a signal indicating the presence or absence of an object through the open collector type output terminal $T_8$ is used, the series combination 106 of the resistor $R_4$ and the switch $SW_2$ (switching means) is connected between the output terminal $T_8$ and the power source $V_{reg1}$. A voltage developed at the terminal $T_{11}$ between the resistor $R_4$ and the output terminal $T_8$ is accepted as the output from the DMM2 (sensor means). The switch $SW_2$ (switching means) is turned on or off in response to the generation of the emission signal $Ir_0$ for the IRED 202. Therefore, when a signal carrying information is not produced from the output terminal $T_8$, the amount of power wasted by the resistor $R_4$ can be decreased. Furthermore, the emission signal $Ir_0$ for emission of the IRED 202 is used to turn on or off the switch $SW_2$, thus enabling simplification of the configuration. That is, it is not necessary to produce two output signals used for projection of light and for controlling the switch $SW_2$, respectively; otherwise, the configuration would be complicated.

The CPU 102 performs processing for modifying the accepted signal carrying information to a given output form. The processed signal is delivered from the output terminals $O_1$, $O_2$, etc. For example, a signal obtained by inverting the level of the signal at the terminal Data or a coded signal is delivered.

The power supply to the DMM2 (sensor means) is cut off, and then the CPU 102 performs the remaining processing. This further reduces the amount of current consumed by the DMM2 (sensor means). That is, the amount of power wasted by the DMM2 (sensor means) can be reduced.

If signals are produced from the output terminals $O_1$, $O_2$, etc., the CNT 1 returns to its initial state. The mode of operation is switched to the standby mode of low power consumption. Consequently, further power savings can be achieved at the controller 1 (control means).

In FIG. 2, no object is detected during period TA. At instant B, information carried by the signal appearing at the terminal Data is latched.

During period TB, a signal indicating a state different from the state of the terminal $O_1$ is produced to the terminal $O_2$.

During period TC, the DMM2 keeps detecting an object. The state at the terminal Data is 0. Since the signal $P_4$ is turned ON only for a short period around the data latch, the average amount of current consumed by the resistor $R_4$ is smaller than heretofore.

FIG. 3 shows the operation where the operating frequency $f_0$ of the DMIC 201 is varied. FIG. 3, (c), illustrates the operation where the operating frequency $f_0$ is high. FIG. 3, (d), illustrates the operation where the operating frequency $f_0$ is low. In the present embodiment, the timing at which data is latched is varied in response to the emission signal $IR_0$ that varies in response to variations in the operating frequency $f_0$ as mentioned previously. That is, the timing at which data is latched varies in response to variations in the operating frequency $f_0$ ($tL<tL'$, $t_3=t_3'$, and $t_4<t_4'$). Therefore, the operating frequency $f_0$ can be set regardless of the time for which power is supplied to the DMM 2. Furthermore, power consumption savings are achieved because the signal $P_2$ turned off to cut off the supply of power to the distance measurement sensor immediately after latching data.

In addition, it is not necessary to adjust controller CNT 1 according to the rated operating speed of the DMM2 while saving power consumption. This improves the generality of the controller CNT 1.

If the distance measurement IC 201 can deliver a signal indicating the completion of a measurement of a distance or a signal (Ed in FIG. 1) confirming data, this signal is detected by the CPU 102 instead of $Ir_0$. The resulting signal may be used for latching of data or for control of the operation of the signals $P_2$ and $P_4$.

The switch $S_1$ is provided as a function-setting switch and used to change the measurement interval or the like. Although only one switch $S_1$ is shown, plural switches may also be used.

The present invention provides a sensor system having a sensor and a controller for controlling the supply of power to the sensor. The controller accepts the output from the sensor and performs desired processing. This sensor system is characterized in that the controller includes a power-supply switch for switching on or off the supply of power to the sensor and a control circuit for turning off the power-supply switch in response to acceptance of the output from the sensor. This assures that the output from the sensor is accepted. Furthermore, power consumption savings can be accomplished. In the past, electrical power has been wasted to assure acceptance of the sensor means output, or power consumption decrease has made it impossible to accept the output from the sensor. The sensor system according to the present invention is free of these problems.

Where the sensor consists of a distance measurement sensor having a light projection means, a driver circuit for supplying an emission signal to the light projection means, and a light-receiving means for receiving light arising from projection of light from the light projection means, if the controller starts acceptance of the output from the sensor in response to the emission signal, the same advantages can be produced as the foregoing. Furthermore, the emission signal can be used for both light projection and the start of acceptance, thus simplifying the structure.

In another embodiment of the invention, the sensor includes an open collector type output terminal producing the output described above. The aforementioned controller further includes a series combination of a resistor and a switching means. The series combination is connected between the output terminal described above and a power supply. A voltage developed at the terminal between the resistor and the output terminal is accepted as the output from the sensor. The control circuit turns on or off the switching means according to the emission signal. This structure can reduce the amount of current wasted by the resistor.

Where the controller described above is placed in the standby state of low power consumption in response to the end of the desired processing, the same advantages as the foregoing can be gained. Additionally, the controller can reduced power consumption further.

What is claimed is:

1. A sensor system of comprising:
   a sensor having a sensor power input and an output for supplying a sensor output;
   a controller including;
   a power-supply switch for switching on or off a supply of electrical power to said sensor power input; and
   a control circuit for receiving and processing said sensor output and for turning off said power-supply switch in response to said control circuit accepting said sensor output from said sensor; and
   said sensor being a distance measurement sensor including a light projection means, a driver circuit for supplying an emission signal to said light projection means, and a light-receiving means for receiving light arising from light projected from said light projection means, and wherein said controller starts acceptance of the sensor output from said sensor according to said emission signal.

2. The sensor system of claim 1, wherein:
   said sensor includes an open collector type output terminal as said output for producing said sensor output,
   said controller further includes a series combination of a resistor and a switching means,
   said series combination is connected between said output terminal and a power supply, and a voltage developed at a terminal between said series combination and said output terminal is accepted as the sensor output from said sensor, and
   said control circuit turns on or off said switching means based on operation of said emission signal.

3. The sensor system of any one of claims 1 and 2, wherein said controller enters a standby state of low power consumption in response to an end of said processing of said sensor output.

4. A sensor system comprising:
   a sensor module having a sensor module power input and an output for supplying a sensor module output;
   a sensor module power-supply switch for switching on or off a supply of electrical power to said sensor module power input;
   a control circuit for receiving and processing said sensor module output and providing a processed output; and
   said control circuit including means for detecting completion of reception of said sensor module output and for turning off said sensor module power-supply switch in response to the detection of completion and prior to said control circuit processing said sensor module output.

5. The sensor system of claim 4 wherein:
   said sensor module includes:
   a sensor element; and
   a sensing circuit for processing an output signal from said sensor element to provide said sensor module output and for outputting an output indicating signal signifying a start of output of said sensor module output;
   said control circuit including:
   a data line switch controlling power to a data line receiving said sensor module output to enable reading of said sensor module output; and
   a data line control means for setting said data line switch to enable reading of said sensor module output in response to receiving said output indicating signal.

6. The sensor system of claim 5 wherein said data line control means sets said data line switch to disable reading said sensor module output in response to the detection of completion and prior to said control circuit processing said sensor module output.

7. The sensor system of claim 6 wherein said sensor module includes:
   an emitting element for sending out an emission to be sensed by said sensor element; and
   said sensing circuit including a drive circuit producing a drive signal for driving said emitting element and driving generation of said output indicating signal.

8. The sensor system of claim 7 wherein said drive signal and said output indicating signal are formed of a number of pulses and said data line control means recognizes completion of said number of pulses to set said data line switch to enable reading of said sensor module output.

9. The sensor system of claim 7 wherein said emitting element is a light generating device and said sensor element is a light detecting device.

10. The sensor system of claim 6 wherein said sensor module includes:
    an emitting element for sending out an emission to be sensed by said sensor element; and
    said sensing circuit including a first output supplying said output indicating signal and a second output for a drive circuit to output a drive signal for driving said emitting element.

11. The sensor system of claim 10 wherein said emitting element is a light generating device and said sensor element is a light detecting device.

12. The sensor system of claim 6 wherein said sensor module includes:
    an emitting element for sending out an emission of light to be sensed by said sensor element;
    said sensing circuit including a drive circuit to output a drive signal for driving said emitting element; and
    said sensor element is a light detection device.

13. A sensor system comprising:
    a sensor module including:
    a sensor element; and a sensing circuit for processing an output signal from said sensor element to provide a sensor module output and for outputting an output indicating signal signifying a start of output of said sensor module output; and a control circuit for receiving and processing said sensor module output and providing a processed output, said control circuit including:

a data line switch controlling power to a data line receiving said sensor module output to enable reading of said sensor module output; and a data line control means for setting said data line switch to enable reading of said sensor module output in response to receiving said output indicating signal.

14. The sensor system of claim 13 wherein said sensor module includes:

an emitting element for sending out an emission to be sensed by said sensor element;

said sensing circuit including a drive circuit producing a drive signal for driving said emitting element and driving generation of said output indicating signal.

15. The sensor system of claim 13 wherein:

said control circuit include means for detecting completion of reception of said sensor module output; and said data line control means sets said data line switch to disable reading said sensor module output in response to the detection of completion and prior to said control circuit processing said sensor module output.

16. The sensor system of claim 15 wherein said sensor module includes:

an emitting element for sending out an emission to be sensed by said sensor element; and said sensing circuit including a drive circuit producing a drive signal for driving said emitting element and driving generation of said output indicating signal.

17. The sensor system of claim 16 wherein said drive signal and said output indicating signal are formed of a number of pulses and said data line control means recognizes completion of said number of pulses to set said data line switch to enable reading of said sensor module output.

18. The sensor system of claim 16 wherein said emitting element is a light generating device and said sensor element is a light detecting device.

19. The sensor system of claim 15 wherein said sensor module includes:

an emitting element for sending out an emission to be sensed by said sensor element; and said sensing circuit including a first output supplying said output indicating signal and a second output for a drive circuit to output a drive signal for driving said emitting element.

* * * * *